US008311819B2

(12) United States Patent
Hetherington et al.

(10) Patent No.: US 8,311,819 B2
(45) Date of Patent: Nov. 13, 2012

(54) SYSTEM FOR DETECTING SPEECH WITH BACKGROUND VOICE ESTIMATES AND NOISE ESTIMATES

(75) Inventors: Phillip A. Hetherington, Port Moody (CA); Mark Fallat, Vancouver (CA)

(73) Assignee: QNX Software Systems Limited, Kanata, Ontario ( * ) Notice: Subject to any disclaimer, the term of this patent is extended or adjusted under 35 U.S.C. 154(b) by 322 days.

(21) Appl. No.: 12/079,376

(22) Filed: Mar. 26, 2008

(65) Prior Publication Data

US 2008/0228478 A1 Sep. 18, 2008

Related U.S. Application Data

(63) Continuation-in-part of application No. 11/804,633, filed on May 18, 2007, now Pat. No. 8,165,880, which is a continuation-in-part of application No. 11/152,922, filed on Jun. 15, 2005, now Pat. No. 8,170,875.

(51) Int. Cl.
*G10L 15/20* (2006.01)
*G10L 15/04* (2006.01)

(52) U.S. Cl. ......................... 704/233; 704/253; 704/251

(58) Field of Classification Search .................. 704/248, 704/253, E17.005, E15.005, E11.003, E15.006
See application file for complete search history.

(56) References Cited

U.S. PATENT DOCUMENTS 55,201 A 5/1866 Cushing
4,435,617 A 3/1984 Griggs et al.
4,486,900 A 12/1984 Cox et al.
4,531,228 A 7/1985 Noso et al.
4,532,648 A 7/1985 Noso et al.
4,630,305 A 12/1986 Borth et al.
4,701,955 A 10/1987 Taguchi (Continued)

FOREIGN PATENT DOCUMENTS

CA 2158847 9/1994

(Continued)

OTHER PUBLICATIONS

Avendano, C., Hermansky, H., "Study on the Dereverberation of Speech Based on Temporal Envelope Filtering," Proc. ICSLP '96, pp. 889-892, Oct. 1996.

(Continued)

*Primary Examiner* — Jesse Pullias
(74) *Attorney, Agent, or Firm* — Brinks Hofer Gilson & Lione

(57) ABSTRACT

A system detects a speech segment that may include unvoiced, fully voiced, or mixed voice content. The system includes a digital converter that converts a time-varying input signal into a digital-domain signal. A window function passes signals within a programmed aural frequency range while substantially blocking signals above and below the programmed aural frequency range when multiplied by an output of the digital converter. A frequency converter converts the signals passing within the programmed aural frequency range into a plurality of frequency bins. A background voice detector estimates the strength of a background speech segment relative to the noise of selected portions of the aural spectrum. A noise estimator estimates a maximum distribution of noise to an average of an acoustic noise power of some of the plurality of frequency bins. A voice detector compares the strength of a desired speech segment to a criterion based on an output of the background voice detector and an output of the noise estimator.

17 Claims, 12 Drawing Sheets

U.S. PATENT DOCUMENTS

| | | | | |
|---|---|---|---|---|
| 4,811,404 | A | 3/1989 | Vilmur et al. | |
| 4,843,562 | A | 6/1989 | Kenyon et al. | |
| 4,856,067 | A | 8/1989 | Yamada et al. | |
| 4,945,566 | A * | 7/1990 | Mergel et al. | 704/253 |
| 4,989,248 | A | 1/1991 | Schalk et al. | |
| 5,027,410 | A | 6/1991 | Williamson et al. | |
| 5,056,150 | A | 10/1991 | Yu et al. | |
| 5,146,539 | A | 9/1992 | Doddington et al. | |
| 5,151,940 | A | 9/1992 | Okazaki et al. | |
| 5,152,007 | A | 9/1992 | Uribe | |
| 5,201,028 | A | 4/1993 | Theis | |
| 5,293,452 | A | 3/1994 | Picone et al. | |
| 5,305,422 | A | 4/1994 | Junqua | |
| 5,313,555 | A | 5/1994 | Kamiya | |
| 5,400,409 | A | 3/1995 | Linhard | |
| 5,408,583 | A * | 4/1995 | Watanabe et al. | 704/264 |
| 5,479,517 | A | 12/1995 | Linhard | |
| 5,495,415 | A | 2/1996 | Ribbens et al. | |
| 5,502,688 | A | 3/1996 | Recchione et al. | |
| 5,526,466 | A | 6/1996 | Takizawa | |
| 5,568,559 | A | 10/1996 | Makino | |
| 5,572,623 | A * | 11/1996 | Pastor | 704/233 |
| 5,584,295 | A | 12/1996 | Muller et al. | |
| 5,596,680 | A | 1/1997 | Chow et al. | |
| 5,617,508 | A | 4/1997 | Reaves | |
| 5,677,987 | A | 10/1997 | Seki et al. | |
| 5,680,508 | A | 10/1997 | Liu | |
| 5,687,288 | A | 11/1997 | Dobler et al. | |
| 5,692,104 | A | 11/1997 | Chow et al. | |
| 5,701,344 | A | 12/1997 | Wakui | |
| 5,732,392 | A | 3/1998 | Mizuno et al. | |
| 5,794,195 | A * | 8/1998 | Hormann et al. | 704/253 |
| 5,933,801 | A | 8/1999 | Fink et al. | |
| 5,949,888 | A | 9/1999 | Gupta et al. | |
| 5,963,901 | A * | 10/1999 | Vahatalo et al. | 704/233 |
| 6,011,853 | A | 1/2000 | Koski et al. | |
| 6,029,130 | A | 2/2000 | Ariyoshi | |
| 6,098,040 | A * | 8/2000 | Petroni et al. | 704/234 |
| 6,163,608 | A | 12/2000 | Romesburg et al. | |
| 6,167,375 | A | 12/2000 | Miseki et al. | |
| 6,173,074 | B1 | 1/2001 | Russo | |
| 6,175,602 | B1 | 1/2001 | Gustafsson et al. | |
| 6,192,134 | B1 | 2/2001 | White et al. | |
| 6,199,035 | B1 | 3/2001 | Lakaniemi et al. | |
| 6,216,103 | B1 | 4/2001 | Wu et al. | |
| 6,240,381 | B1 | 5/2001 | Newson | |
| 6,304,844 | B1 | 10/2001 | Pan et al. | |
| 6,317,711 | B1 | 11/2001 | Muroi | |
| 6,324,509 | B1 | 11/2001 | Bi et al. | |
| 6,356,868 | B1 | 3/2002 | Yuschik et al. | |
| 6,405,168 | B1 | 6/2002 | Bayya et al. | |
| 6,434,246 | B1 | 8/2002 | Kates et al. | |
| 6,453,285 | B1 | 9/2002 | Anderson et al. | |
| 6,487,532 | B1 | 11/2002 | Schoofs et al. | |
| 6,507,814 | B1 | 1/2003 | Gao | |
| 6,535,851 | B1 | 3/2003 | Fanty et al. | |
| 6,574,592 | B1 | 6/2003 | Nankawa et al. | |
| 6,574,601 | B1 | 6/2003 | Brown et al. | |
| 6,587,816 | B1 | 7/2003 | Chazan et al. | |
| 6,643,619 | B1 | 11/2003 | Linhard et al. | |
| 6,687,669 | B1 | 2/2004 | Schrögmeier et al. | |
| 6,711,540 | B1 | 3/2004 | Bartkowiak | |
| 6,721,706 | B1 | 4/2004 | Strubbe et al. | |
| 6,782,363 | B2 | 8/2004 | Lee et al. | |
| 6,822,507 | B2 | 11/2004 | Buchele | |
| 6,850,882 | B1 | 2/2005 | Rothenberg | |
| 6,859,420 | B1 | 2/2005 | Coney et al. | |
| 6,873,953 | B1 | 3/2005 | Lennig | |
| 6,910,011 | B1 | 6/2005 | Zakarauskas | |
| 6,996,252 | B2 | 2/2006 | Reed et al. | |
| 7,117,149 | B1 | 10/2006 | Zakarauskas | |
| 7,146,319 | B2 | 12/2006 | Hunt | |
| 7,535,859 | B2 * | 5/2009 | Brox | 370/290 |
| 2001/0028713 | A1 | 10/2001 | Walker | |
| 2002/0071573 | A1 | 6/2002 | Finn | |
| 2002/0176589 | A1 | 11/2002 | Buck et al. | |
| 2003/0040908 | A1 | 2/2003 | Yang et al. | |
| 2003/0120487 | A1 | 6/2003 | Wang | |
| 2003/0216907 | A1 | 11/2003 | Thomas | |
| 2004/0078200 | A1 | 4/2004 | Alves | |
| 2004/0138882 | A1 | 7/2004 | Miyazawa | |
| 2004/0165736 | A1 | 8/2004 | Hetherington et al. | |
| 2004/0167777 | A1 | 8/2004 | Hetherington et al. | |
| 2005/0096900 | A1 | 5/2005 | Bossemeyer et al. | |
| 2005/0114128 | A1 | 5/2005 | Hetherington et al. | |
| 2005/0240401 | A1 | 10/2005 | Ebenezer | |
| 2006/0034447 | A1 | 2/2006 | Alves et al. | |
| 2006/0053003 | A1 | 3/2006 | Suzuki et al. | |
| 2006/0074646 | A1 | 4/2006 | Alves et al. | |
| 2006/0080096 | A1 | 4/2006 | Thomas et al. | |
| 2006/0100868 | A1 | 5/2006 | Hetherington et al. | |
| 2006/0115095 | A1 | 6/2006 | Giesbrecht et al. | |
| 2006/0116873 | A1 | 6/2006 | Hetherington et al. | |
| 2006/0136199 | A1 | 6/2006 | Nongpiur et al. | |
| 2006/0161430 | A1 * | 7/2006 | Schweng | 704/233 |
| 2006/0178881 | A1 | 8/2006 | Oh et al. | |
| 2006/0251268 | A1 | 11/2006 | Hetherington et al. | |
| 2007/0033031 | A1 | 2/2007 | Zakarauskas | |
| 2007/0219797 | A1 | 9/2007 | Liu et al. | |
| 2007/0288238 | A1 | 12/2007 | Hetherington et al. | |

FOREIGN PATENT DOCUMENTS

| | | | |
|---|---|---|---|
| CA | 2157496 | | 10/1994 |
| CA | 2158064 | | 10/1994 |
| CN | 1042790 | A | 6/1990 |
| EP | 0 076 687 | A1 | 4/1983 |
| EP | 0 629 996 | A2 | 12/1994 |
| EP | 0 629 996 | A3 | 12/1994 |
| EP | 0 750 291 | A1 | 12/1996 |
| EP | 0 543 329 | B1 | 2/2002 |
| EP | 1 450 353 | A1 | 8/2004 |
| EP | 1 450 354 | A1 | 8/2004 |
| EP | 1 669 983 | A1 | 6/2006 |
| JP | 06269084 | A2 | 9/1994 |
| JP | 06319193 | A | 11/1994 |
| JP | 2000-250565 | | 9/2000 |
| KR | 10-1999-0077910 | A | 10/1999 |
| KR | 10-2001-0091093 | A | 10/2001 |
| WO | WO 0041169 | A1 | 7/2000 |
| WO | WO 0156255 | A1 | 8/2001 |
| WO | WO 0173761 | A1 | 10/2001 |
| WO | WO 2004/111996 | | 12/2004 |

OTHER PUBLICATIONS

Berk et al., "Data Analysis with Microsoft Excel", Duxbury Press, 1998, pp. 236-239 and 256-259.

Fiori, S., Uncini, A., and Piazza, F., "Blind Deconvolution by Modified Bussgang Algorithm", Dept. of Electronics and Automatics—University of Ancona (Italy), ISCAS 1999.

Learned, R.E. et al., A Wavelet Packet Approach to Transient Signal Classification, Applied and Computational Harmonic Analysis, Jul. 1995, pp. 265-278, vol. 2, No. 3, USA, XP 000972660. ISSN: 1063-5203. abstract.

Nakatani, T., Miyoshi, M., and Kinoshita, K., "Implementation and Effects of Single Channel Dereverberation Based on the Harmonic Structure of Speech," Proc. of IWAENC-2003, pp. 91-94, Sep. 2003.

Puder, H. et al., "Improved Noise Reduction for Hands-Free Car Phones Utilizing Information on a Vehicle and Engine Speeds", Sep. 4-8, 2000, pp. 1851-1854, vol. 3, XP009030255, 2000. Tampere, Finland, Tampere Univ. Technology, Finland Abstract.

Quatieri, T.F. et al., Noise Reduction Using a Soft-Dection/Decision Sine-Wave Vector Quantizer, International Conference on Acoustics, Speech & Signal Processing, Apr. 3, 1990, pp. 821-824, vol. Conf. 15, IEEE ICASSP, New York, US XP000146895, Abstract, Paragraph 3.1.

Quelavoine, R. et al., Transients Recognition in Underwater Acoustic with Multilayer Neural Networks, Engineering Benefits from Neural Networks, Proceedings of the International Conference EANN 1998, Gibraltar, Jun. 10-12, 1998 pp. 330-333, XP 000974500. 1998, Turku, Finland, Syst. Eng. Assoc., Finland. ISBN: 951-97868-0-5. abstract, p. 30 paragraph 1.

Seely, S., "An Introduction to Engineering Systems", Pergamon Press Inc., 1972, pp. 7-10.

Shust, Michael R. and Rogers, James C., Abstract of "Active Removal of Wind Noise From Outdoor Microphones Using Local Velocity Measurements", *J. Acoust. Soc. Am.*, vol. 104, No. 3, Pt 2, 1998, 1 page.
Shust, Michael R. and Rogers, James C., "Electronic Removal of Outdoor Microphone Wind Noise", obtained from the Internet on Oct. 5, 2006 at: <http://www.acoustics.org/press/136th/mshust.htm>, 6 pages.
Simon, G., Detection of Harmonic Burst Signals, International Journal Circuit Theory and Applications, Jul. 1985, vol. 13, No. 3, pp. 195-201, UK, XP 000974305. ISSN: 0098-9886. abstract.
Vieira, J., "Automatic Estimation of Reverberation Time", Audio Engineering Society, Convention Paper 6107, 116th Convention, May 8-11, 2004, Berlin, Germany, pp. 1-7.
Wahab A. et al., "Intelligent Dashboard With Speech Enhancement", Information, Communications, and Signal Processing, 1997. ICICS, Proceedings of 1997 International Conference on Singapore, Sep. 9-12, 1997, New York, NY, USA, IEEE, pp. 993-997.
Zakarauskas, P., Detection and Localization of Nondeterministic Transients in Time series and Application to Ice-Cracking Sound, Digital Signal Processing, 1993, vol. 3, No. 1, pp. 36-45, Academic Press, Orlando, FL, USA, XP 000361270, ISSN: 1051-2004. entire document.
Savoji, M. H. "A Robust Algorithm for Accurate Endpointing of Speech Signals" Speech Communication, Elsevier Science Publishers, Amsterdam, NL, vol. 8, No. 1, Mar. 1, 1989 (pp. 45-60).
Canadian Examination Report of related application No. 2,575, 632, Issued May 28, 2010.
European Search Report dated Aug. 31, 2007 from corresponding European Application No. 06721766.1, 13 pages.
International Preliminary Report on Patentability dated Jan. 3, 2008 from corresponding PCT Application No. PCT/CA2006/000512, 10 pages.
International Search Report and Written Opinion dated Jun. 6, 2006 from corresponding PCT Application No. PCT/CA2006/000512, 16 pages.
Office Action dated Jun. 12, 2010 from corresponding Chinese Application No. 200680000746.6, 11 pages.
Office Action dated Mar. 27, 2008 from corresponding Korean Application No. 10-2007-7002573, 11 pages.
Office Action dated Mar. 31, 2009 from corresponding Korean Application No. 10-2007-7002573, 2 pages.
Office Action dated Jan. 7, 2010 from corresponding Japanese Application No. 2007-524151, 7 pages.
Office Action dated Aug. 17, 2010 from corresponding Japanese Application No. 2007-524151, 3 pages.
Ying et al.; "Endpoint Detection of Isolated Utterances Based on a Modified Teager Energy Estimate", In Proc. IEEE ICASSP, vol. 2; pp. 732-735; 1993.
Turner, John M. and Dickinson, Bradley W., "A Variable Frame Length Linear Predicitive Coder", Acoustics, Speech, and Signal Processing, IEEE International Conference on ICASSP '78, vol. 3, pp. 454-457.
Office Action dated Jun. 6, 2011 for corresponding Japanese Application No. 2007-524151, 9 pages.

* cited by examiner

SYSTEM FOR DETECTING SPEECH WITH BACKGROUND VOICE ESTIMATES AND NOISE ESTIMATES

PRIORITY CLAIM

This application is a continuation-in-part of U.S. application Ser. No. 11/804,633 filed May 18, 2007, which is a continuation-in-part of U.S. application Ser. No. 11/152,922 filed Jun. 15, 2005. The entire content of these applications are incorporated herein by reference, except that in the event of any inconsistent disclosure from the present disclosure, the disclosure herein shall be deemed to prevail.

BACKGROUND OF THE INVENTION

1. Technical Field

This disclosure relates to a speech processes, and more particularly to a process that identifies speech in voice segments.

2. Related Art

Speech processing is susceptible to environmental noise. This noise may combine with other noise to reduce speech intelligibility. Poor quality speech may affect its recognition by systems that convert voice into commands. A technique may attempt to improve speech recognition performance by submitting relevant data to the system. Unfortunately, some systems fail in non-stationary noise environments, where some noises may trigger recognition errors.

SUMMARY

A system detects a speech segment that may include unvoiced, fully voiced, or mixed voice content. The system includes a digital converter that converts a time-varying input signal into a digital-domain signal. A window function pass signals within a programmed aural frequency range while substantially blocking signals above and below the programmed aural frequency range when multiplied by an output of the digital converter. A frequency converter converts the signals passing within the programmed aural frequency range into a plurality of frequency bins. A background voice detector estimates the strength of a background speech segment relative to the noise of selected portions of the aural spectrum. A noise estimator estimates a maximum distribution of noise to an average of an acoustic noise power of some of the plurality of frequency bins. A voice detector compares the strength of a desired speech segment to a criterion based on an output of the background voice detector and an output of the noise estimator.

Other systems, methods, features, and advantages will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Some speech processors operate when voice is present. Such systems are efficient and effective when voice is detected. When noise or other interference is mistaken for voice, the noise may corrupt the data. An end-pointer may isolate voice segments from this noise. The end-pointer may apply one or more static or dynamic (e.g., automatic) rules to determine the beginning or the end of a voice segment based on one or more speech characteristics. The rules may process a portion or an entire aural segment and may include the features and content described in U.S. application Ser. Nos. 11/804,633 and 11/152,922, both of which are entitled “Speech End-pointer.” Both U.S. applications are incorporated by reference. In the event of an inconsistency between those U.S. applications and this disclosure, this disclosure shall prevail.

In some circumstances, the performance of an end-pointer may be improved. A system may improve the detection and processing of speech segments based on an event (or an occurrence) or a combination of events. The system may dynamically customize speech detection to one or more events or may be pre-programmed to respond to these events. The detected speech may be further processed by a speech end-pointer, speech processor, or voice detection process. In systems that have low processing power (e.g., in a vehicle, car, or in a hand-held system), the system may substantially increase the efficiency, reliability, and/or accuracy of an end-pointer, speech processor, or voice detection process. Noticeable improvements may be realized in systems susceptible to tonal noise.

Figure 1:
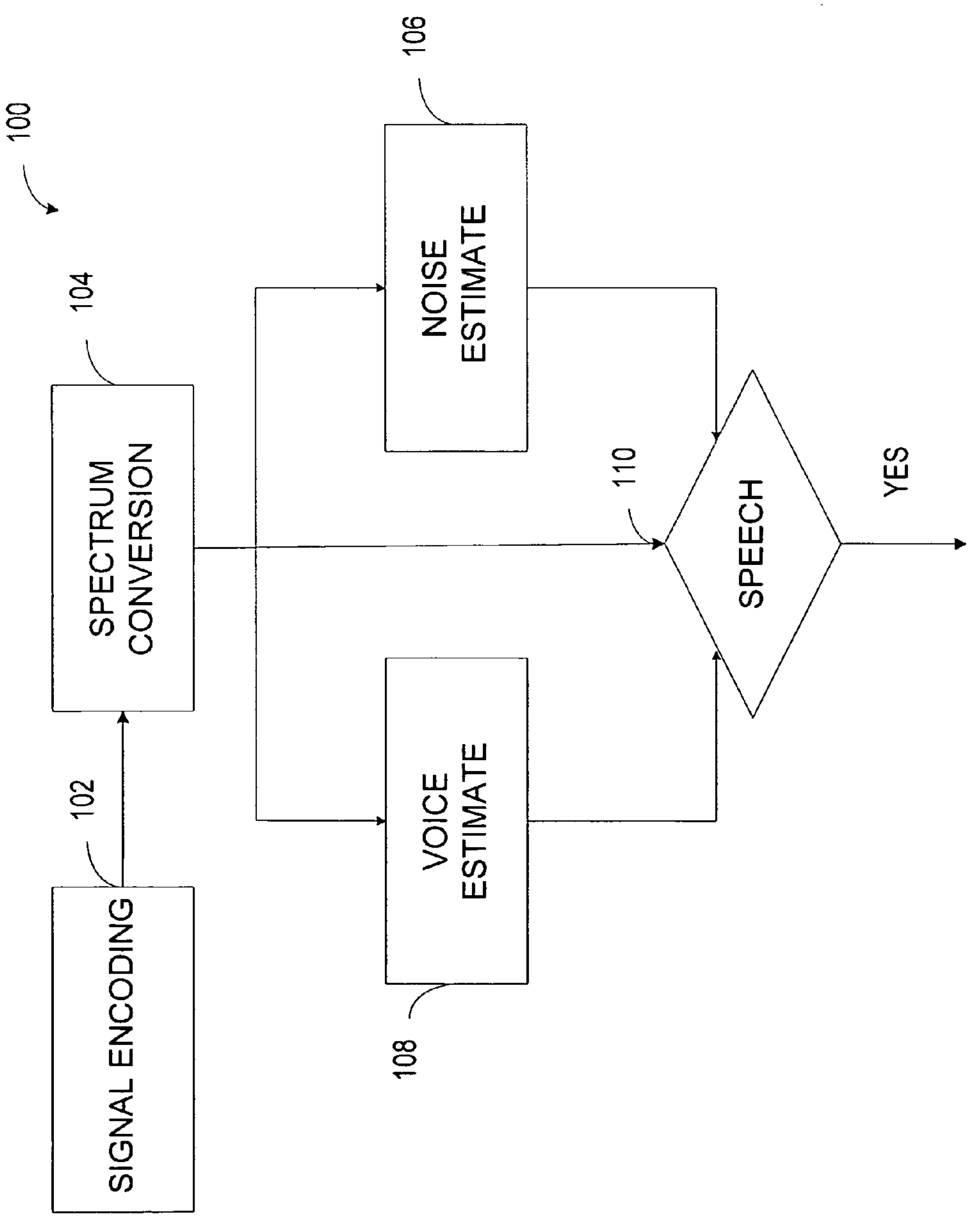
FIG. 1 is a process that identifies potential speech segments.

FIG. 1 is a process 100 that identifies voice or speech segments from meaningless sounds, inarticulate or meaningless talk, incoherent sounds, babble, or other interference that may contaminate it. At 102, a received or detected signal is digitized at a predetermined frequency. To assure a good quality input, the audio signal may be encoded into an operational signal by varying the amplitude of multiple pulses limited to multiple predefined values. At 104 a complex spectrum may be obtained through a Fast Fourier Transform (an FFT) that separates the digitized signals into frequency bins, with each bin identifying an amplitude and a phase across a small frequency range.

At 106, background voice may be estimated by measuring the strength of a voiced segment relative to noise. A time-smoothed or running average may be computed to smooth out the measurement or estimate of the frequency bins before a signal-to-noise ratio (SNR) is measured or estimated. In some processes (and systems later described), the background voice estimate may be a scalar multiple of the smooth or averaged SNR or the smooth or averaged SNR less an offset (which may be automatically or user defined). In some processes the scalar multiple is less than one. In these and other processes, a user may increase or decrease the number of bins or buffers that are processed or measured.

At 108, a background interference or noise is measured or estimated. The noise measurement or estimate may be the maximum distribution of noise to an average of the acoustic noise power of one or more of frequency bins. The process may measure a maximum noise level across many frequency bins (e.g., the frequency bins may or may not adjoin) to derive a noise measurement or estimate over time. In some processes (and systems later described), the noise level may be a scalar multiple of the maximum noise level or a maximum noise level plus an offset (which may be automatically or user defined). In these processes the scalar multiple (of the noise) may be greater than one and a user may increase or decrease the number of bins or buffers that are measured or estimated.

At 110, the process 100 may discriminate, mark, or pass portions of the output of the spectrum that includes a speech signal. The process 100 may compare a maximum of the voice estimate and/or the noise estimate (that may be buffered) to an instant SNR of the output of the spectrum conversion process 104. The process 100 may accept a voice decision and identify speech at 110 when an instant SNR is greater than the maximum of the voice estimate process 108 and/or the noise estimate process 106. The comparison to a maximum of the voice estimate, the noise estimate, or a combination (e.g., selecting maximum values between the two estimates continually or periodically in time) may be selection-based by a user or a program, and may account for the level of noise or background voice measured or estimated to surround a desired speech signal.

To overcome the effects of the interference or to prevent the truncation of voiced or voiceless speech, some processes (and systems later described) may increase the passband or marking of a speech segment. The passband or marking may identify a range of frequencies in time. Other methods may process the input with knowledge that a portion may have been cutoff. Both methods may process the input before it is processed by an end-pointer process, a speech process, or a voice detection process. These processes may minimize truncation errors by leading or lagging the rising and/or falling edges of a voice decision window dynamically or by a fixed temporal or frequency-based amount.

Figure 2:
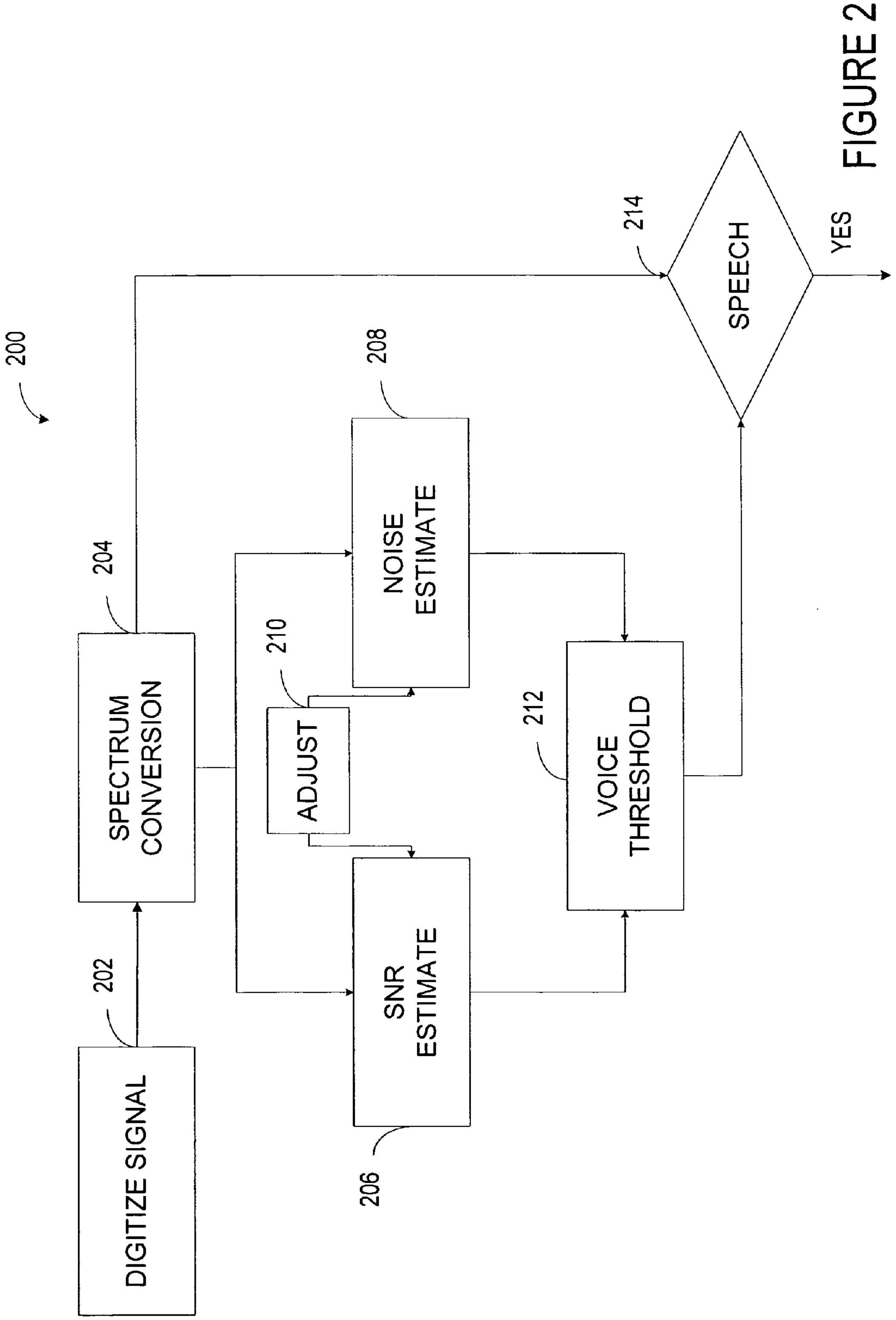
FIG. 2 is a second process that identifies potential speech segments.

FIG. 2 is an alternative detection process 200 that identifies potential speech segments. The process 200 converts portions of the continuously varying input signal in an aural band to the digital and frequency domains, respectively, at 202 and 204. At 206, background SNR may be estimated or measured. A time-smoothed or running average may be computed to smooth out the measurement or estimate of the frequency bins before the SNR is measured or estimated. In some processes, the background SNR estimate may be a scalar multiple of the smooth or averaged SNR or the smooth or averaged SNR less an offset (which may be automatically or user defined). In some processes the scalar multiple is less than one.

At 208, a background noise or interference may be measured or estimated. The noise measurement or estimate may be the maximum variance across one or multiple frequency bins. The process 200 may measure a maximum noise variance across many frequency bins to derive a noise measurement or estimate. In some processes, the noise variance may be a scalar multiple of the maximum noise variance or a maximum noise variance plus an offset (which may be automatically or user defined). In these processes the scalar multiple (of the maximum noise variance) may be greater than one.

In some processes, the respective offsets and/or scalar multipliers may automatically adapt or adjust to a user's environment at 210. The multipliers and/or offsets may adapt automatically to changes in an environment. The adjustment may occur as the processes continuously or periodically detect and analyze the background noise and background voice that may contaminate one or more desired voice segments. Based on the level of the signals detected, an adjustment process may adjust one or more of the offsets and/or scalar multiplier. In an alternative process, the adjustment may not modify the respective offsets and/or scalar multipliers that adjust the background noise and background voice (e.g., smoothed SNR estimate) estimate. Instead, the processes may automatically adjust a voice threshold process 212 after a decision criterion is derived. In these alternative processes, a decision criterion such as a voice threshold may be adjusted by an offset (e.g., an addition or subtraction) or multiple (e.g., a multiplier).

To isolate speech from the noise or other interference surrounding it, a voice threshold 212 may select the maximum value of the SNR estimate 206 and noise estimate 208 at points in time. By tracking both the smooth SNR and the noise variance the process 200 may execute a longer term comparison 214 of the signal and noise as well as the shorter term variations in the noise to the input. The process 200 compares the maximum of these two thresholds (e.g., the decision criterion is a maximum criterion) to the instant SNR of the output of the spectrum conversion at 214. The process 200 may reject a voice decision where the instant SNR is below the maximum values of the higher of these two thresholds.

Figure 11:
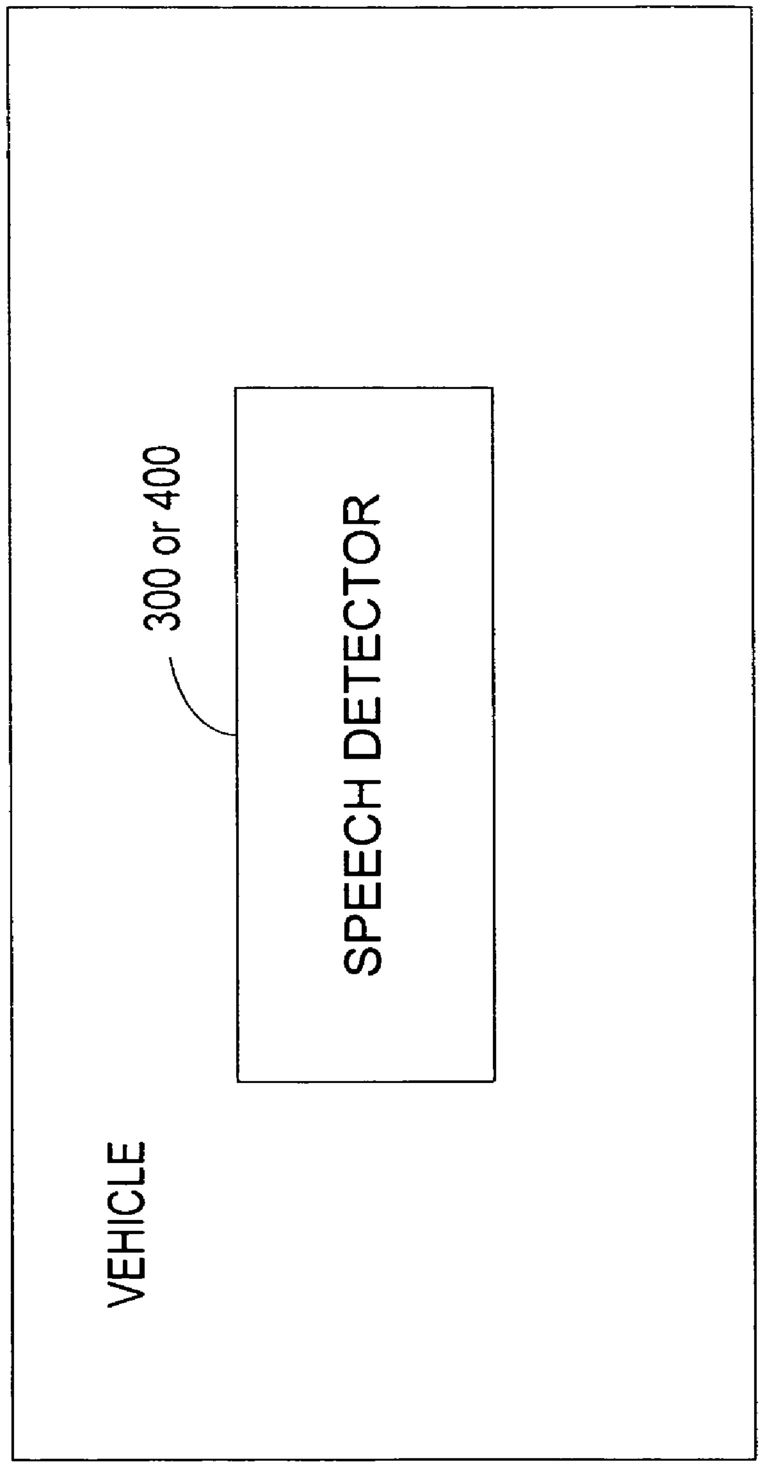
FIG. 11 is a speech detector integrated within a vehicle.
Figure 12:
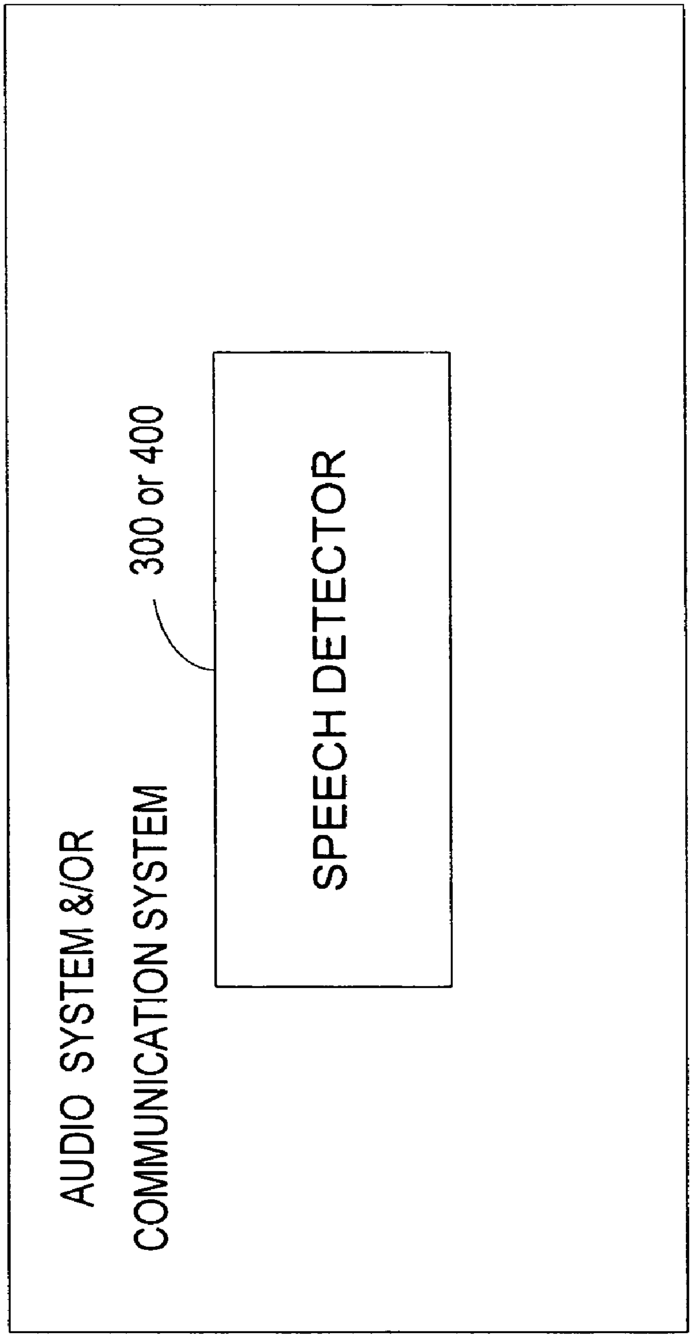
FIG. 12 is a speech detector integrated within hands-free communication device, a communication system, and/or an audio system.

The methods and descriptions of FIGS. 1 and 2 may be encoded in a signal bearing medium, a computer readable medium such as a memory that may comprise unitary or separate logic, programmed within a device such as one or more integrated circuits, or processed by a controller or a computer. If the methods are performed by software, the software or logic may reside in a memory resident to or interfaced to one or more processors or controllers, a wireless communication interface, a wireless system, an entertainment and/or comfort controller of a vehicle or types of non-volatile or volatile memory remote from or resident to a voice detector. The memory may retain an ordered listing of executable instructions for implementing logical functions. A logical function may be implemented through digital circuitry, through source code, through analog circuitry, or through an analog source such as through an analog electrical, or audio signals. The software may be embodied in any computer-readable medium or signal-bearing medium, for use by, or in connection with an instruction executable system, apparatus, device, resident to a vehicle as shown in FIG. 11 or a hands-free system communication system or audio system shown in FIG. 12. Alternatively, the software may be embodied in media players (including portable media players) and/or recorders, audio visual or public address systems, desktop computing systems, etc. Such a system may include a computer-based system, a processor-containing system that includes an input and output interface that may communicate with an automotive or wireless communication bus through any hardwired or wireless automotive communication protocol or other hardwired or wireless communication protocols to a local or remote destination or server.

A computer-readable medium, machine-readable medium, propagated-signal medium, and/or signal-bearing medium may comprise any medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical or tangible connection having one or more wires, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled by a controller, and/or interpreted or otherwise processed. The processed medium may then be stored in a local or remote computer and/or machine memory.

Figure 3:
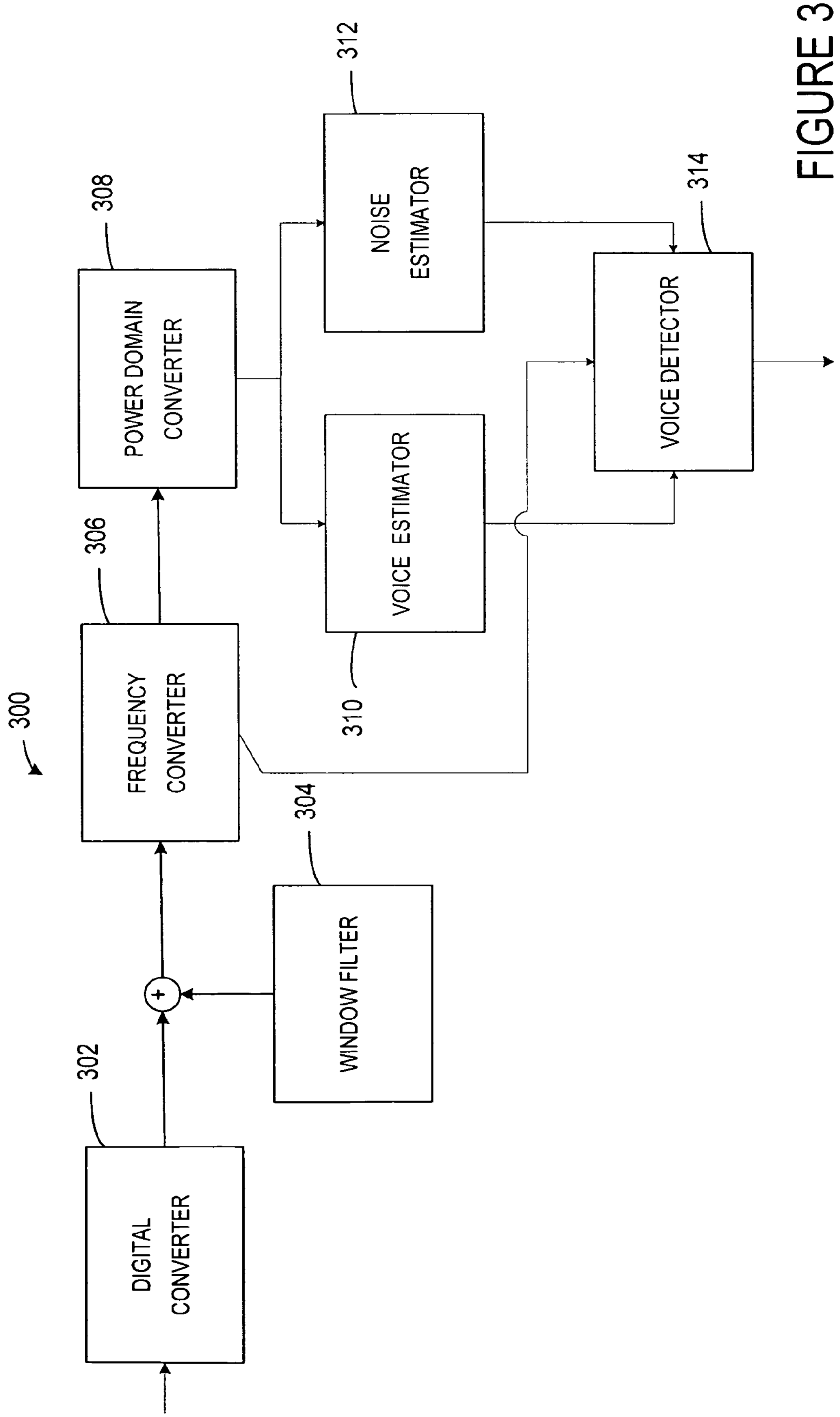
FIG. 3 is a speech detector that identifies potential speech segments.

FIG. 3 is a block diagram of a speech detector 300 that identifies speech that may be contaminated by noise and interference. The noise may occur naturally (e.g., a background conversation) or may be artificially generated (e.g., car speeding up, a window opening, changing the fan settings). The voice and noise estimators may detect the respective signals from the desired signal in a real or in a delayed time no matter how complex the undesired signals may be.

In FIG. 3, a digital converter 302 may receive an unvoiced, fully voiced, or mixed voice input signal. A received or detected signal may be digitized at a predetermined frequency. To assure a good quality, the input signal may be converted to a Pulse-Code-Modulated (PCM) signal. A smooth window 304 may be applied to a block of data to obtain the windowed signal. The complex spectrum of the windowed signal may be obtained by a Fast Fourier Transform (FFT) device 306 that separates the digitized signals into frequency bins, with each bin identifying an amplitude and phase across a small frequency range. Each frequency bin may be converted into the power-spectral domain 308 before measuring or estimating a background voice and a background noise.

To detect background voice in an aural band, a voice estimator 310 measures the strength of a voiced segment relative to noise of selected portions of the spectrum. A time-smoothed or running average may be computed to smooth out the measurement or estimate of the frequency bins before a signal-to-noise ratio (SNR) is measured or estimated. In some voice estimators 310, the background voice estimate may be a scalar multiple of the smooth or averaged SNR or the smooth or averaged SNR less an offset, which may be automatically or user defined. In some voice estimators 310 the scalar multiple is less than one. In these and other systems, a user may increase or decrease the number of bins or buffers that are processed or measured.

To detect background noise in an aural band, a noise estimator 312 measures or estimates a background interference or noise. The noise measurement or estimate may be the maximum distribution of noise to an average of the acoustic noise power of one or a number of frequency bins. The background noise estimator 312 may measure a maximum noise level across many frequency bins (e.g., the frequency bins may or may not adjoin) to derive a noise measurement or estimate over time. In some noise estimators 312, the noise level may be a scalar multiple of the maximum noise level or a maximum noise level plus an offset, which may be automatically or user defined. In these systems the scalar multiple of the background noise may be greater than one and a user may increase or decrease the number of bins or buffers that are measured or estimated.

A voice detector 314 may discriminate, mark, or pass portions of the output of the frequency converter 306 that includes a speech signal. The voice detector 314 may continuously or periodically compare an instant SNR to a maximum criterion. The system 300 may accept a voice decision and identify speech (e.g., via a voice decision window) when an instant SNR is greater than the maximum of the voice estimate process 108 and/or the noise estimate process 106. The comparison to a maximum of the voice estimate, the noise estimate, a combination, or a weighted combination (e.g., established by a weighting circuit or device that may emphasize or deemphasize an SNR or noise measurement/estimate) may be selection-based. A selector within the voice detector 314 may select the maximum criterion and/or weighting values that may be used to derive a single threshold used to identify or isolate speech based on the level of noise or background voice (e.g., measured or estimated to surround a speech signal).

Figure 4:
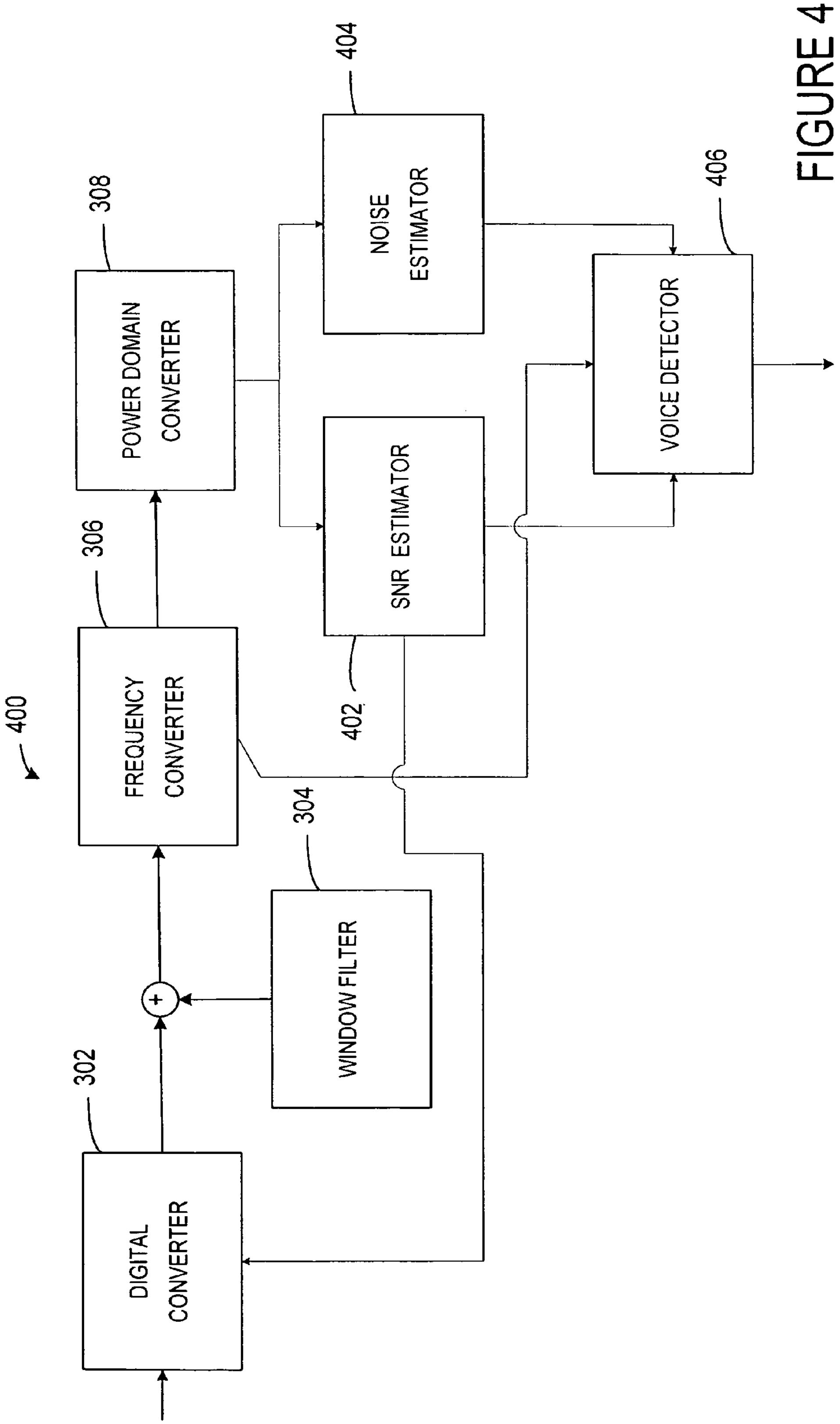
FIG. 4 is an alternative speech detector that identifies potential speech segments.

FIG. 4 is an alternative detector that also identifies speech. The detector 400 digitizes and converts a selected time-varying signal to the frequency domain through a digital converter 302, windowing device 304, and an FFT device or frequency converter 306. A power domain converter 308 may convert each frequency bin into the power spectral domain. The power domain converter 308 in FIG. 4 may comprise a power detector that smoothes or averages the acoustic power in each frequency bin before it is transmitted to the SNR estimator 402. The SNR estimator 402 or SNR logic may measure the strength of a voiced segment relative to the strength of a detected noise. Some SNR estimators may include a multiplier or subtractor. An output of the SNR estimator 402 may be a scalar multiple of the smooth or averaged SNR or the smooth or averaged SNR less an offset (which may be automatically derived or user defined). In some systems the scalar multiple is less than one. When an SNR estimator 402 does not detect a voice segment, further processing may terminate. In FIG. 4, the SNR estimator 402 may terminate processing when a comparison of the SNR to a programmable threshold indicates an absence of speech (e.g., the noise spectrum may be more prominent than the harmonic spectrum). In other systems, a noise estimator 404 may terminate processing when signal periodicity is not detected or sufficiently detected (e.g., the quasi-periodic structure voiced segments are not detected). In other systems, the SNR estimator 402 and noise estimator 404 may jointly terminate processing when speech is not detected.

The noise estimator 404 may measure the background noise or interference. The noise estimator 404 may measure or estimate the maximum variance across one or more frequency bins. Some noise estimators 404 may include a multiplier or adder. In these systems, the noise variance may be a scalar multiple of the maximum noise variance or a maximum noise variance plus an offset (which may be automatically or user defined). In these processes the scalar multiple (of the maximum noise variance) may be greater than one.

In some systems, the respective offsets and/or scalar multipliers may automatically adapt or adjust to a user's environment. The adjustments may occur as the systems continuously or periodically detect and analyze the background noise and voice that may surround one or more desired (e.g., selected) voice segments. Based on the level of the signals detected, an adjusting device may adjust the offsets and/or scalar multiplier. In some alternative systems, the adjuster may automatically modify a voice threshold that the speech detector 406 may use to detect speech.

To isolate speech from the noise or other interference surrounding it, the voice detector 406 may apply decision criteria to isolate speech. The decision criteria may comprise the maximum value of the SNR estimate 206 and noise estimate 208 at points in time (that may be modified by the adjustment described above). By tracking both the smooth SNR and the noise variance the system 400 may make a longer term comparisons of the detected signal to an adjusted signal-to-noise ratio and variations in detected noise. The voice detector 406 may compare the maximum of two thresholds (that may be further adjusted) to the instant SNR of the output of the frequency converter 306. The system 400 may reject a voice decision or detection where the instant SNR is below the maximum values between these two thresholds at specific points in time.

Figure 5:
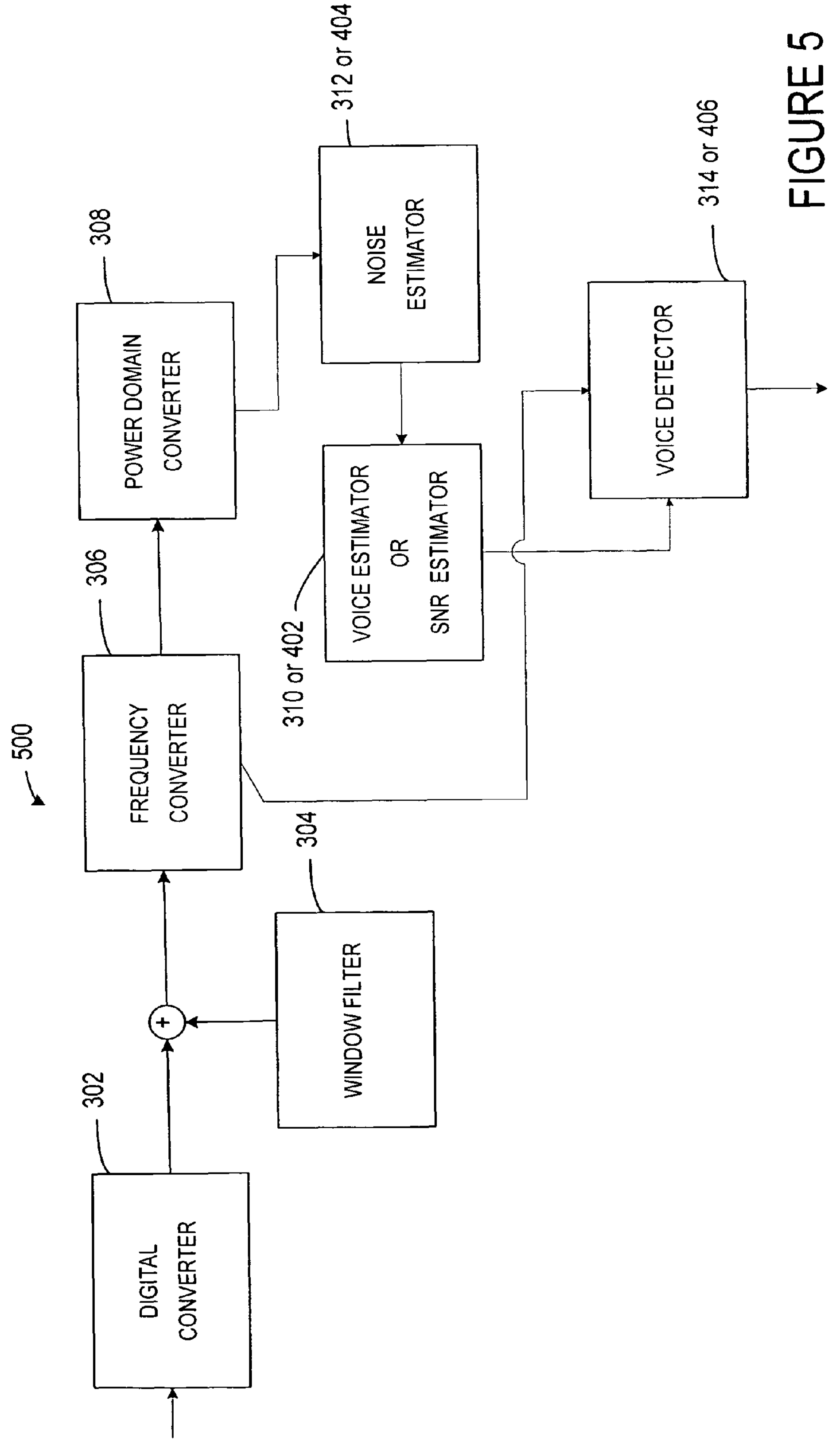
FIG. 5 is an alternative speech detector that identifies potential speech segments.

FIG. 5 shows an alternative speech detector 500. The structure shown in FIG. 4 may be modified so that the noise and voice estimates are derived in series. An alternative system estimates voice or SNR before estimating noise in series.

Figure 6:
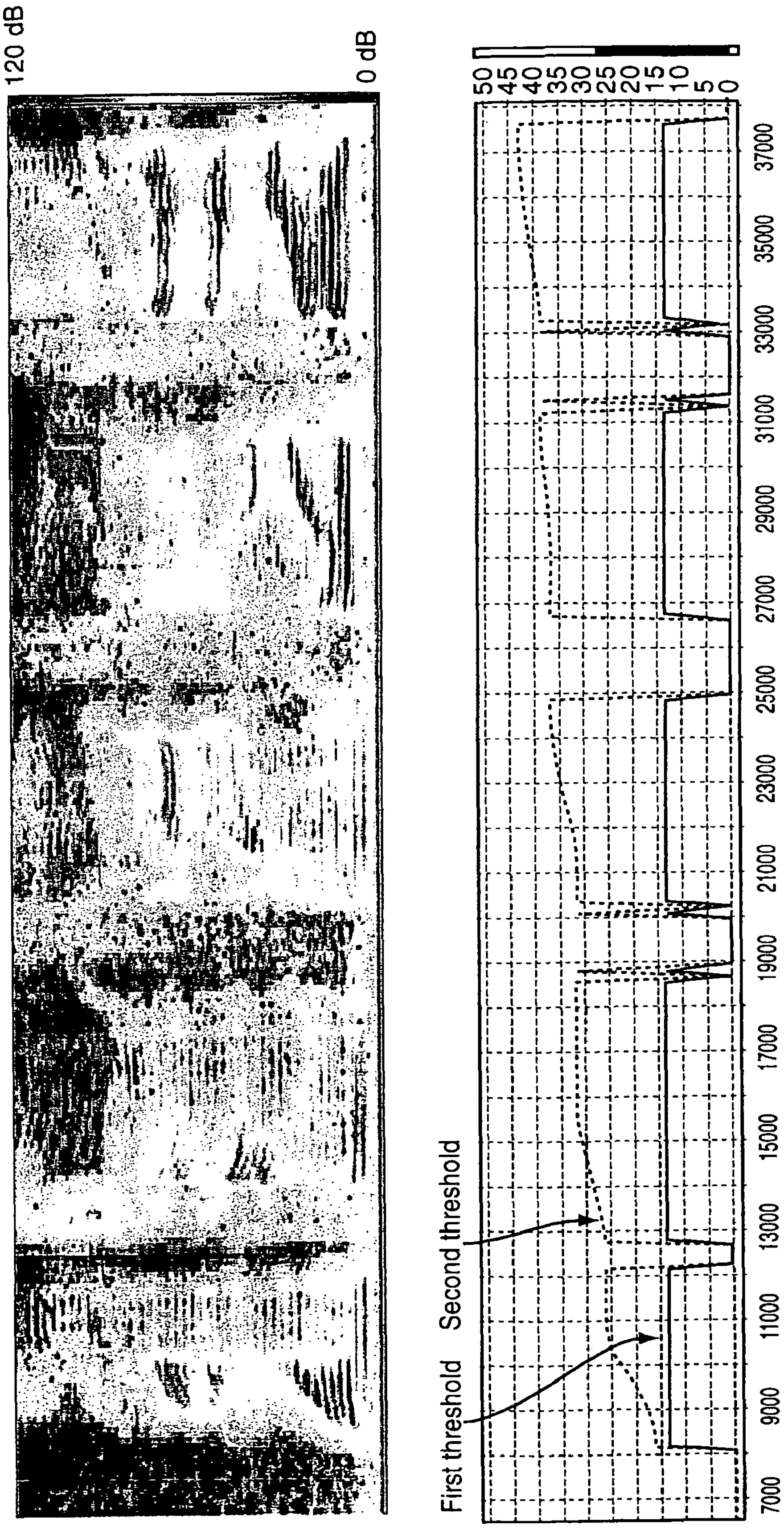
FIG. 6 is a speech sample positioned above a first and a second threshold.

FIG. 6 shows a voice sample contaminated with noise. The upper frame shows a two-dimensional pattern of speech shown through a spectrogram. The vertical dimension of the spectrogram corresponds to frequency and the horizontal dimension to time. The darkness pattern is proportional to signal energy. The voiced regions and interference are characterized by a striated appearance due to the periodicity of the waveform.

The lower frame of FIG. 6 shows an output of the noise estimator (or noise estimate process) as a first threshold and an output of the voice estimator (or a voice estimate process) as the second threshold. Where voice is prominent, the level and slope of the second threshold increases. The nearly unchanging slope and low intensity of the background noise shown as the first threshold is reflected in the block-like structure that appears to change almost instantly between speech segments.

Figure 7:
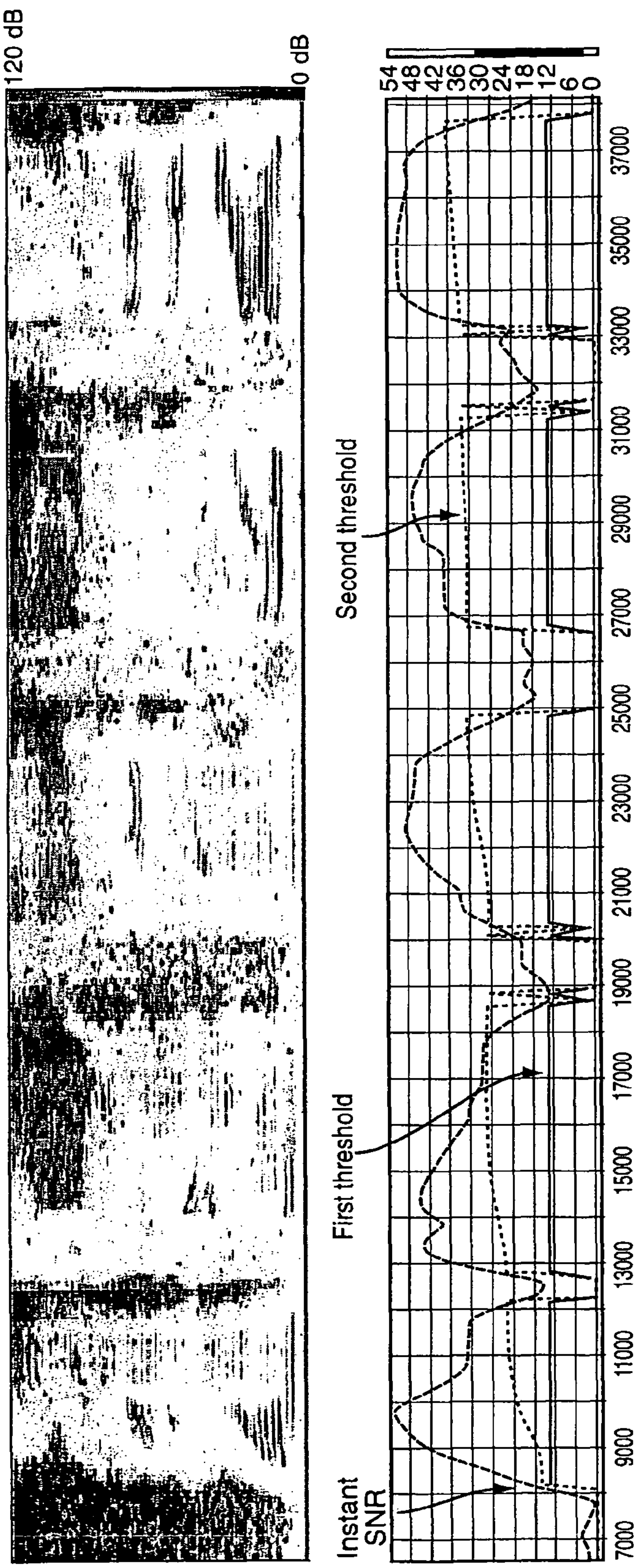
FIG. 7 is a speech sample positioned above a first and a second threshold and an instant signal-to-noise ratio (SNR).

FIG. 7 shows a spectrogram of a voice signal and noise positioned above a comparison of an output of the noise estimator or noise estimate process (the first threshold), the voice estimator or a voice estimate process (the second threshold), and an instant SNR. When speech is detected, the instant SNR and second threshold increase, but at differing rates. The noise variance or first threshold is very stable because there is a small amount of noise and that noise is substantially uniform in time (e.g., has very low variance).

Figure 8:
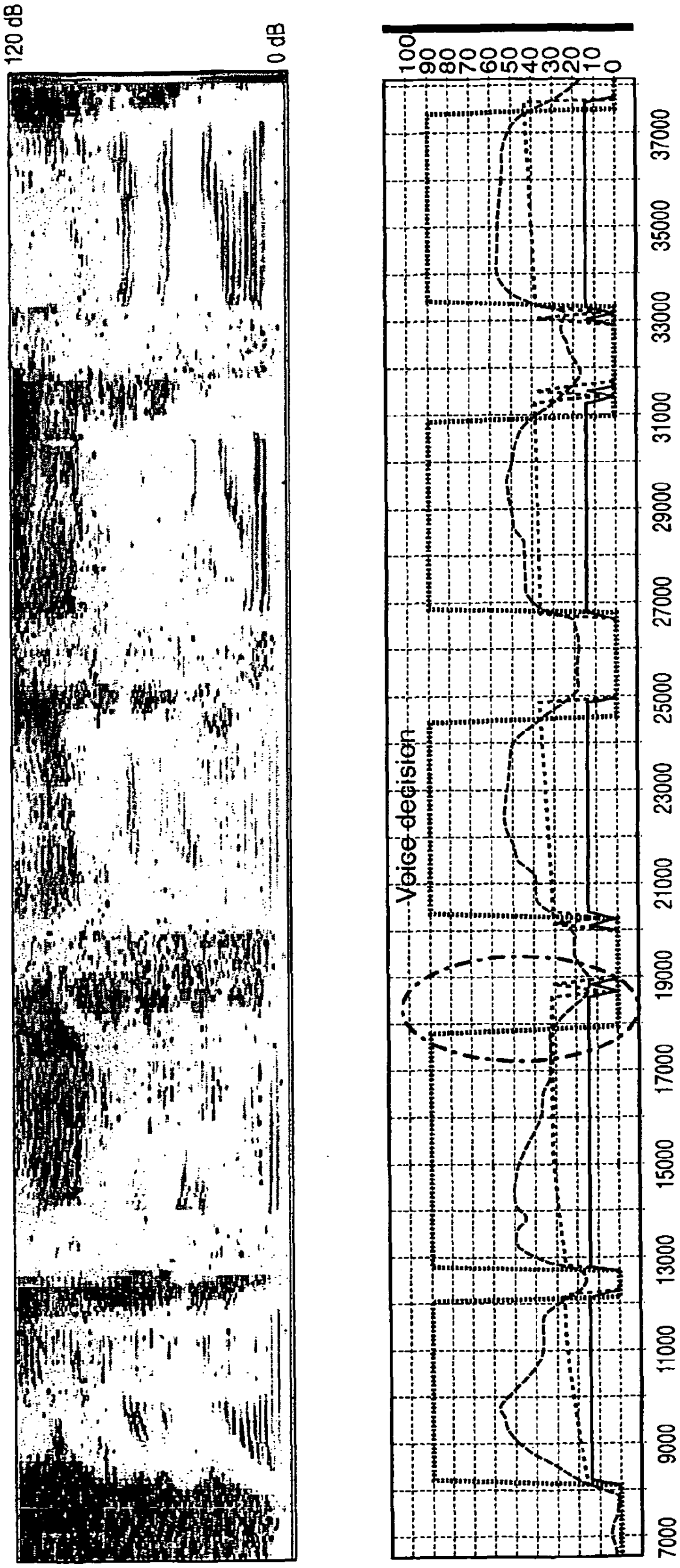
FIG. 8 a speech sample positioned above a first and a second threshold, instant SNR, and a voice decision window, with a portion of rejected speech highlighted.

FIG. 8 shows a spectrogram of a voice signal and noise positioned above a comparison of an output of the noise estimator or noise estimate process (the first threshold), the voice estimator or a voice estimate process (the second threshold), the instant SNR, and the results of a speech identification process or speech detector. The beginning and end of the voice segments are substantially identified by the intervals within the voice decision. When the utterance falls below the greater of the first or second threshold, the voice decision is rejected, as shown in the circled area.

Figure 9:
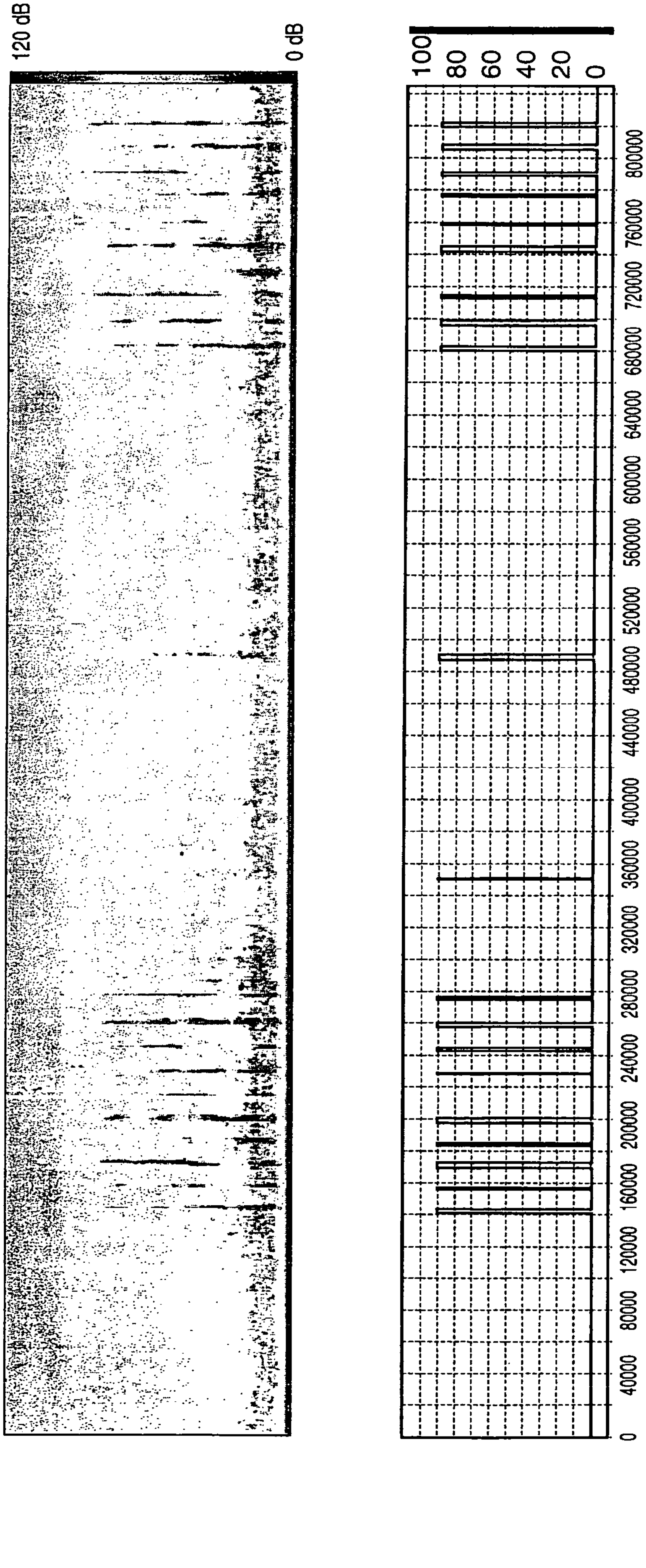
FIG. 9 is a speech sample positioned above an output of a process that identifies potential speech or a speech detector.
Figure 10:
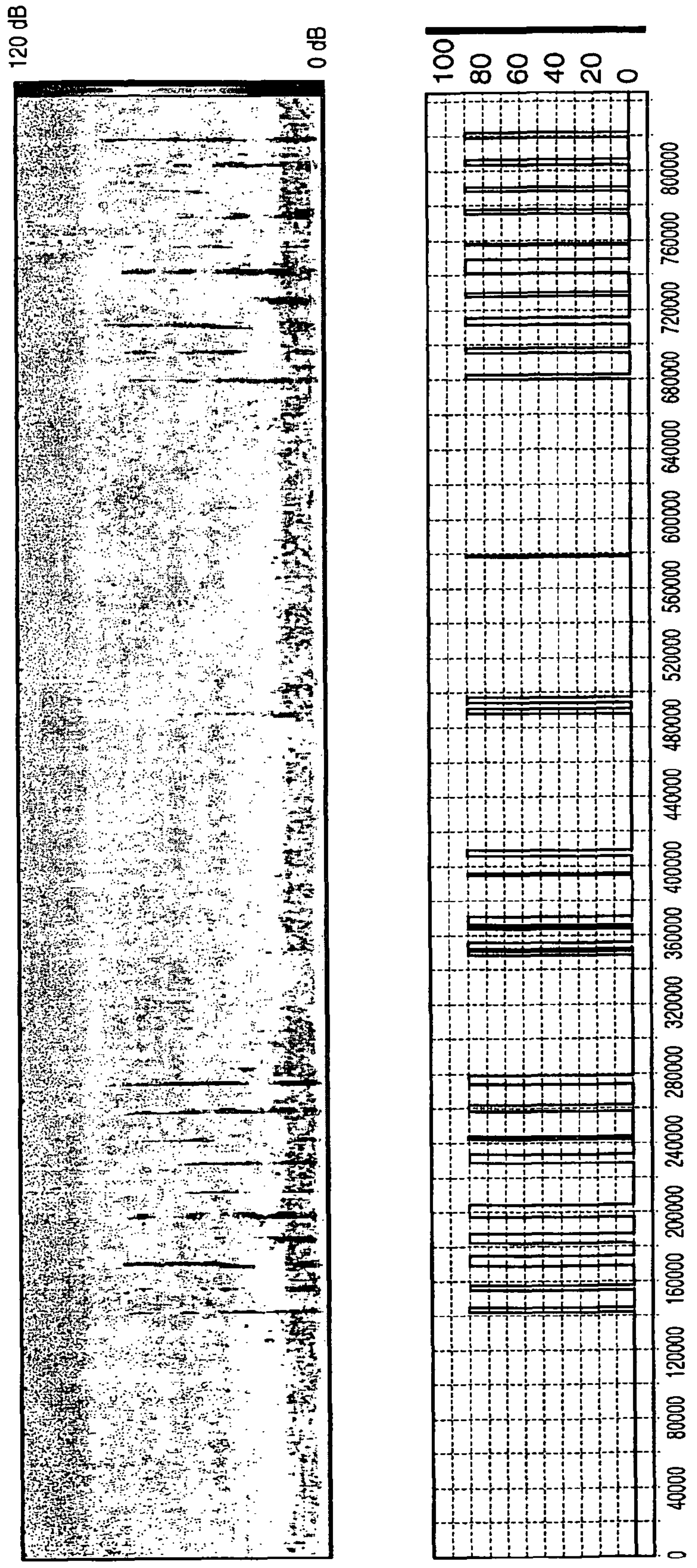
FIG. 10 is a speech sample positioned above an output of a process that identifies potential speech not as effectively.

The voice estimator or voice estimate process may identify a desired speech segment, especially in environments where the noise itself is speech (e.g., tradeshow, train station, airport). In some environments, the noise is voice but not the desired voice the process is attempting to identify. In FIGS. 1-8 the voice estimator or voice estimate process may reject lower level background speech by adjusting the multiplication and offset factors for the first and second thresholds. FIGS. 9 and 10 show an exemplary tradeshow file processed with and without the voice estimator or voice estimate process. A comparison of these drawings shows that there are fewer voice decisions in FIG. 9 than in FIG. 10.

The voice estimator or voice estimate process may comprise a pre-processing layer of a process or system to ensure that there are fewer erroneous voice detections in an end-pointer, speech processor, or secondary voice detector. It may use two or more adaptive thresholds to identify or reject voice decisions. In one system, the first threshold is based on the estimate of the noise variance. The first threshold may be equal to or substantially equal to the maximum of a multiple of the noise variance or the noise variance plus a user defined or an automated offset. A second threshold may be based on a temporally smoothed SNR estimate. In some systems, speech is identified through a comparison to the maximum of the temporally smoothed SNR estimate less an offset (or a multiple of the temporally smoothed SNR) and the noise variance plus an offset (or a multiple of the noise variance).

Other alternate systems include combinations of some or all of the structure and functions described above or shown in one or more or each of the Figures. These systems are formed from any combination of structure and function described herein or illustrated within the figures.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A process that improves speech detection by processing a limited frequency band comprising:
- encoding a limited frequency band of an input into a signal by varying an amplitude of a pulse width modulated signal that is limited to a plurality of predefined values;
- separating the signal into frequency bins in which each frequency bin identifies an amplitude and a phase;
- estimating a signal strength of a background voice segment in time;
- estimating a distribution of noise to an average acoustic power of one or a plurality of frequency bins;
- comparing a signal-to-noise ratio of each frequency bin to a maximum of the estimated signal strength of the background voice segment and the estimated distribution of noise to the average acoustic power; and
- identifying a speech segment from noise that surrounds the speech segment based on the comparison.

2. The process that improves speech detection of claim 1, where a Fast Fourier transform separates the signal into frequency bins.

3. The process that improves speech detection of claim 1, where the act of estimating of the signal strength of the background voice segment comprises an estimate of a time smoothed signal.

4. The process that improves speech detection of claim 3, where the act of estimating of the signal strength of the background voice segment comprises measuring a signal-to-noise ratio of the time smoothed signal.

5. The process that improves speech detection of claim 4, further comprising modifying the estimation of the signal strength of the background voice segment through a multiplication with a scalar quantity.

6. The process that improves speech detection of claim 4, further comprising modifying the estimation of the signal strength of the background voice segment through a subtraction of an offset.

7. The process that improves speech detection of claim 1, further comprising modifying the estimation of the distribution of noise the average acoustic power through a multiplication with a scalar quantity.

8. The process that improves speech detection of claim 1, further comprising modifying the estimation of the distribution of noise to the average acoustic power through an addition of an offset.

9. A process that improves speech processing by processing a limited frequency band comprising:

converting a limited frequency band of a continuously varying input into a digital-domain signal;

converting the digital-domain signal into a frequency-domain signal;

estimating a signal strength of a smoothed background voice segment in time of the digital-domain signal relative to noise;

estimating a noise-variance of a segment of the digital-domain signal;

comparing an instant signal-to-noise ratio of the digital-domain signal to the estimated signal strength of the smoothed background voice segment in time of the digital domain signal relative to noise and the estimated noise-variance; and identifying a speech segment when the instant signal-to-noise ratio of the digital-domain signal exceeds a maximum of the estimated signal strength of the smoothed background voice segment relative to noise and the estimated noise variance.

10. The process that improves speech processing of claim 9, further comprising modifying the estimation of the signal strength of the smooth background voice segment through a multiplication with a scalar quantity.

11. The process that improves speech processing of claim 10, where the scalar quantity is less than one.

12. The process that improves speech processing of claim 9, further comprising modifying the estimation of the signal strength of the smoothed background voice segment through a subtraction of an offset.

13. The process that improves speech processing of claim 9, further comprising modifying the estimation of the noise-variance through a multiplication with a scalar quantity.

14. The process that improves speech processing of claim 13, where the scalar quantity is greater than about one.

15. The process that improves speech processing of claim 9, further comprising modifying the estimation of the noise-variance through an addition of an offset.

16. A system that detects a speech segment that includes an unvoiced, a fully voiced, or a mixed voice content comprising:

a digital converter that converts a time-varying input signal into a digital-domain signal;

a window function configured to pass signals within a programmed aural frequency range while substantially blocking signals above and below the programmed aural frequency range when multiplied by an output of the digital converter;

a frequency converter that converts the signals passing within the programmed aural frequency range into a plurality of frequency bins;

a background voice detector configured to estimate a strength of a background speech segment relative to noise of selected portions of an aural spectrum;

a noise estimator configured to estimate a maximum distribution of noise to an average of an acoustic noise power of some of the plurality of frequency bins; and a voice detector configured to compare an instant signal-to-noise ratio of a desired speech segment to a maximum of an output of the background voice detector and an output of the noise estimator.

17. The system of claim 16 further comprising an end-pointer that applies one or more static or dynamic rules to determine a beginning or an end of the desired speech segment processed by the voice detector.

* * * * *